Sept. 2, 1969  R. W. JOHNS  3,464,251

TUBE TAPERING DEVICE WITH VARIABLE DIE ORIFICE

Filed Sept. 20, 1967  4 Sheets-Sheet 1

INVENTOR.
RODERICK W. JOHNS

By Stuart W. Wohlgemuth
ATTORNEY

Sept. 2, 1969 R. W. JOHNS 3,464,251
TUBE TAPERING DEVICE WITH VARIABLE DIE ORIFICE
Filed Sept. 20, 1967 4 Sheets-Sheet 2

INVENTOR.
RODERICK W. JOHNS

By Stuart W. Wohlgemuth
ATTORNEY

Sept. 2, 1969    R. W. JOHNS    3,464,251
TUBE TAPERING DEVICE WITH VARIABLE DIE ORIFICE
Filed Sept. 20, 1967    4 Sheets-Sheet 3
FIG. 5
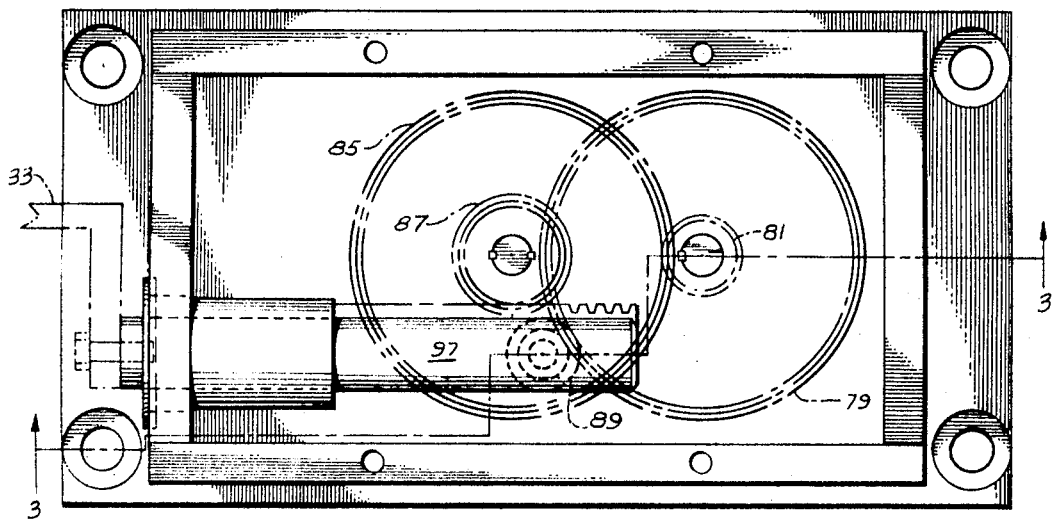
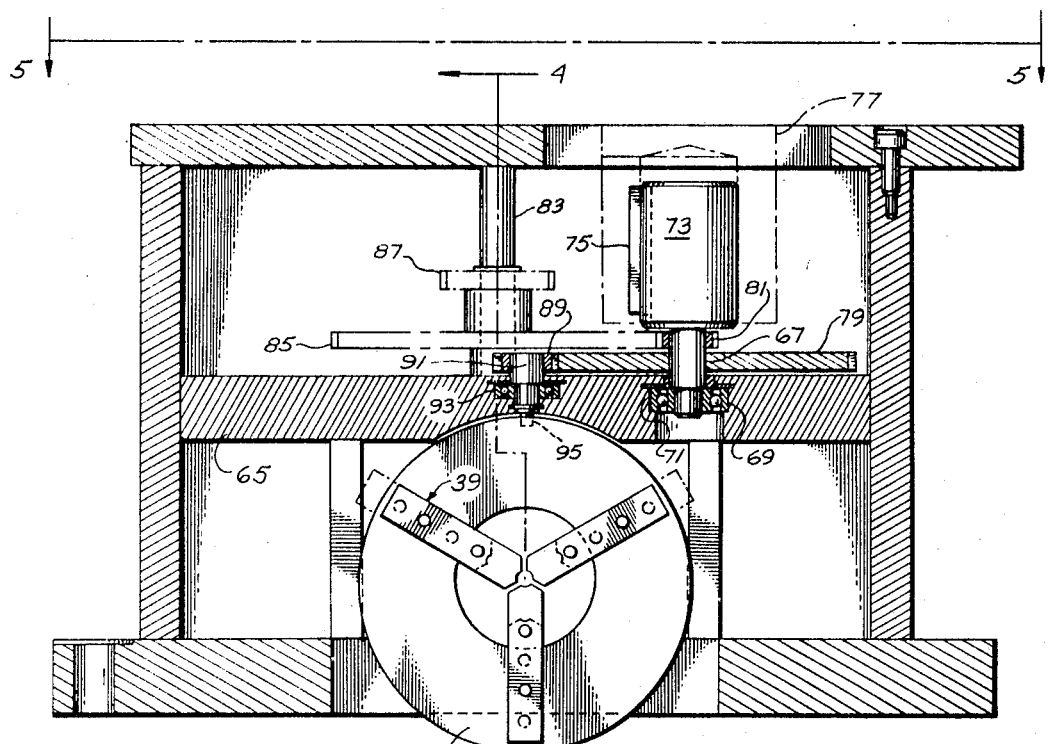
FIG. 3
INVENTOR.
RODERICK W. JOHNS
BY
Stuart W. Wohlgemuth
ATTORNEY Sept. 2, 1969   R. W. JOHNS   3,464,251
TUBE TAPERING DEVICE WITH VARIABLE DIE ORIFICE
Filed Sept. 20, 1967   4 Sheets-Sheet 4

INVENTOR.
RODERICK W. JOHNS
BY John E. Kelly
ATTORNEY

United States Patent Office 3,464,251
Patented Sept. 2, 1969

3,464,251
TUBE TAPERING DEVICE WITH VARIABLE DIE ORIFICE
Roderick W. Johns, Simi, Calif., assignor to North American Rockwell Corporation
Filed Sept. 20, 1967, Ser. No. 674,047
Int. Cl. B21b *19/10;* B21c *1/24, 3/12*
U.S. Cl. 72—100
10 Claims

ABSTRACT OF THE DISCLOSURE

A tube tapering device incorporating a chuck mounting at least three angularly aligned and radially slidable jaws whose inner ends are formed with die peripheries. The die peripheries collectively constitute a die orifice that can be varied by simultaneously sliding the die peripheries toward or from the die orifice axis. The tube being tapered is rotated about its axis and is maintained in axial tension so that a tube-forming mandrel is not required.

CROSS-REFERENCE TO RELATED APPLICATION

This is a continuation-in-part of a copending application entitled "Tube Tapering Device," U.S. application Ser. No. 469,088, filed July 2, 1965, and now abandoned.

BACKGROUND OF THE INVENTION

The instant invention is a variable die orifice tapering arrangement for tapering workpieces of circular cross section such as tubes and solid rod.

Numerous approaches and techniques are known for tapering workpieces of circular cross section. In one approach a pair of nonadjustable rotary draw dies with circumferentially formed tapered die grooves bear against opposing sides of a tube and coact to taper the tube. The tube is maintained in axial tension between the die grooves (e.g., U.S. Patent 3,019,678 to Le Fiell). Another approach comprehends equipping a die chuck with three radially slidable roller dies that cooperate with a mandrel to taper a tube, the mandrel being inserted inside the tube to control the inner diameter of the tube (e.g., U.S. Patent 3,195,331 to Curtis et al.).

Many prior art tube tapering techniques require an annealing treatment of the tube between successive passes by the tapering device, since the tube tends to become work hardened as tapering proceeds. Thus in order to accomplish a significant reduction in diameter of the tube, multiple passes of the tapering device over the tube are required with annealing between each pass. One of the primary reasons for the working of the tube is that pressure exerted on opposite sides of the tube by diametrically opposed dies causes unequal pressure points in the tube. This causes in and out pressure which, in turn, as indicated, works the tube. Additionally, many prior art devices are limited as to the reduction per pass due to the particular configuration of the dies used for the tapering. Often a die can perform a taper of only a small percentage before it must be replaced with a die of different configuration so that further tapering can be accomplished.

Another variable draw die arrangement, as disclosed in British Patent 647,185, published Dec. 6, 1950, includes three equiangularly spaced shoe dies whose inner peripheries combine to define a die orifice for receiving a tubular workpiece to be tapered. The dies can be simultaneously rocked about individual pivot pins to cooperate in varying the die orifice and imparting varying degrees of tapering to the workpiece. Each die periphery is formed with a die groove, whose axis extends in the direction of the die orifice axis. The concave radius of the groove is greater at the leading edge of the groove and diminishes gradually toward the trailing edge of the groove. The dies are rotated around and move axially of the workpiece to achieve the desired tapering.

SUMMARY OF THE INVENTION

Briefly described the invention is a draw die arrangement for tapering workpieces of circular cross section such as tubes or solid rods. A chuck assembly connects at least three angularly aligned jaws whose inner ends are formed with identically contoured die peripheries that collectively define a die orifice. The peripheries are characterized by grooves whose longitudinal axes are aligned substantially in the same direction as that assumed by the die orifice axis. When inserted in the die orifice, the workpiece is tapered by simultaneously moving the jaws toward or withdrawing them from the die axis. Movement of the jaws toward the die orifice axis results in a tapered workpiece of relatively narrow diameter while withdrawing the jaws from the axis results in a tapered workpiece of relatively enlarged diameter. During tapering the workpiece is maintained in axial tension so that a customary tube-forming mandrel is not required. While being tapered, the workpiece is rotated about its axis. Movement of the jaws that dictates the desired taper contouring is controlled by a template linked by a hydraulic actuating system to the jaws.

The concave contouring of each die groove is characterized by a radius that remains constant between the groove leading edge, i.e.; the end of the groove that first encounters the workpiece to be tapered, and the groove trailing edge. This facilitates fabrication of the die peripheries. The radial distance between the leading edge and the die orifice axis is always greater than the radial distance between the groove trailing edge and the die orifice axis. The inlet opening where the workpiece is admitted for tapering is larger than the outlet opening. The tube outlet opening is larger than the narrowest opening of the die orifice where deformation forces are exerted on the workpiece, so that the egressing portion of the tapered workpiece will not be gouged, pitted, or galled, by the trailing edge. The longitudinal axes of the die grooves are defined by convex curves of constant radius and the planes passing through the convex curves intersect in a straight line that coincides with the die orifice axis.

BRIEF DESCRIPTION OF THE DRAWINGS

The unique aspects and advantages of this invention will be fully appreciated upon studying the following detailed description in conjunction with the drawings in which:

FIG. 3 is a partially sectioned front view of the arrangement of FIG. 2;

FIG. 5 is a top plan view of FIG. 3;

DESCRIPTION OF THE PREFERRED EMBODIMENTS

Figure 1:
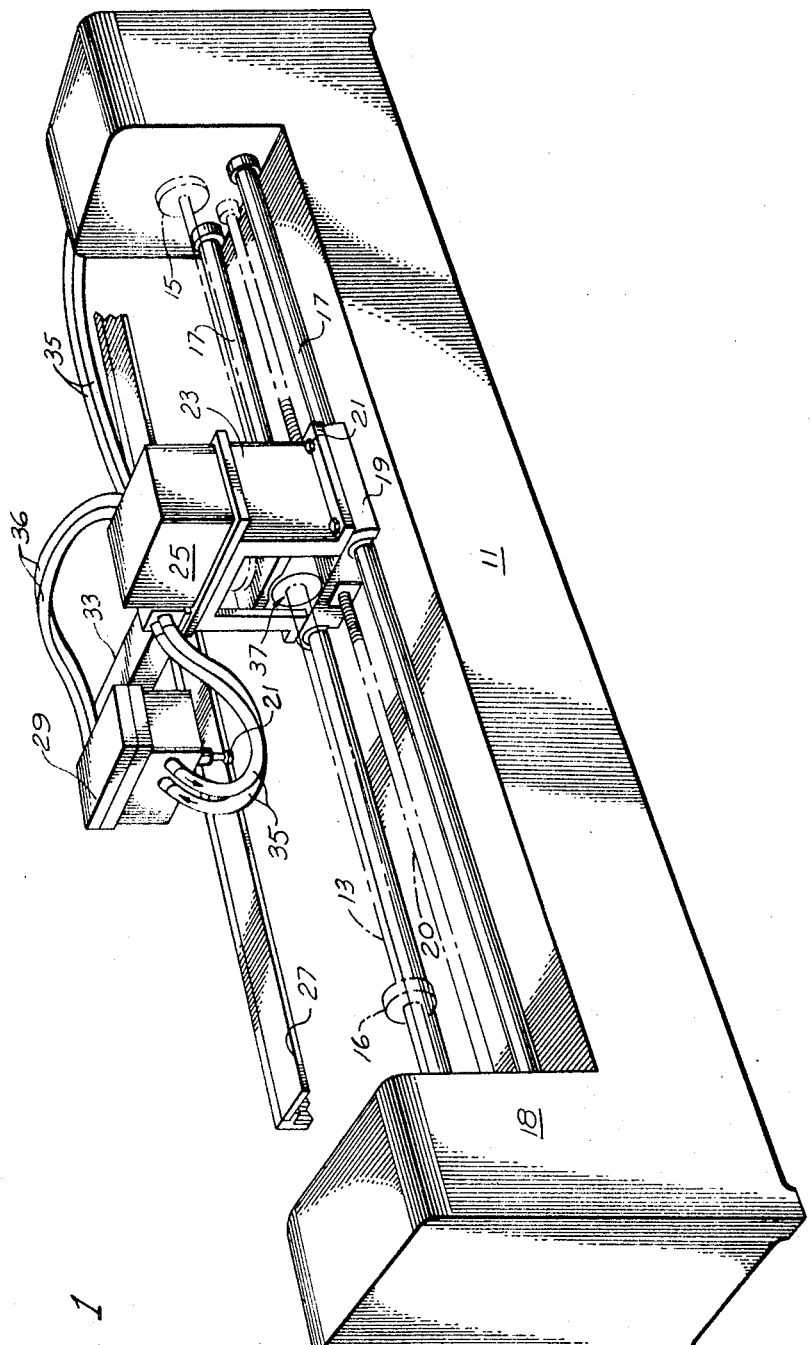
FIG. 1 is a perspective representation of the workpiece tapering arrangement of this invention.

Referring now to FIG. 1 there is shown an assembly for tapering a tubular workpiece utilizing particularly the novel device of the invention. A conventional lathe apparatus 11 can be utilized for supporting the device of the invention as well as supporting and rotating a tube to be formed. A tube 13 is suspended between chucks 15 and 16 at each end of the length of device 11. The tube is preferably maintained in tension by means of the axially moveable chuck 16 which is connected to hydraulic tensioning means disposed within the housing 18 so that the wall thickness can be controlled in the tapered section. A suitable tension applying device for applying axial tension to a workpiece being tapered is fully described in U.S. patent application Ser. No. 622,168, filed on Mar. 10, 1967, on an invention assigned to the assignee of this invention. The tube is rotated during the tapering thereof through the rotation of the end chucks 15. Mounted on two guides 17 is a base portion 19 of the device of the invention used to taper the tube. The device traverses the tube during the tapering operation through the rotation of endless screw 20 passing through the base portion. Secured to the base 19 by bolts 21 is a housing or support structure 23 which contains the gearing and moveable jaws to taper the tube. Mounted on top of the device of support structure 23 is a hydraulically operated rotary piston situated within the outer casing 45. A template 27 is provided adjacent the lathe and serves to provide the outline for the taper desired on the tube. A hydraulic proportioner valve 29 is displaced adjacent the template 27 and has a stylus 29 extending therefrom which maintains contact with the template. The hydraulic proportioner control valve 29 is suspended by a moveable arm 33 from support structure 23. Hydraulic lines 35 circulate a hydraulic fluid between a hydraulic pump not shown located in housing 11 and control valve 29. A second set of lines 36 carry the hydraulic fluid between the proportioner control valve 29 and a circular hydraulic piston 25. Both the hydraulic proportioner control valve 29 and circular piston 25 are conventional items available on the commercial market. Thus, they are not shown in detail. An example of the circular hydraulic piston is a Rotac piston manufactured by Excell-O Corp. One proportioner control valve is the Mimik valve made by Retor Developments, Ltd.

Figure 2:
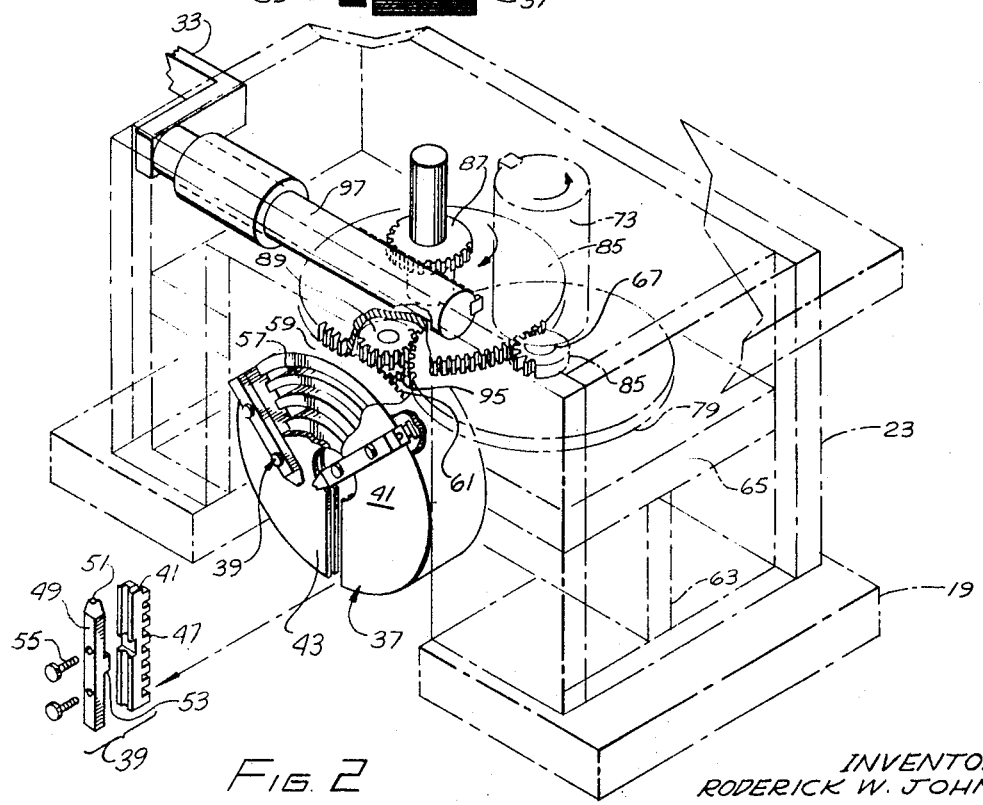
FIG. 2 is a partially sectioned pictorial view of the arrangement for tapering tubes.

Turning now to FIG. 2, there is shown in detail the gearing arrangements and operation of the moveable jaws of the tube tapering device of the invention. Disposed within support structure 23 is a conventional type chuck 37 which is often found in lathes. This could be called the common 3-jaw lathe chuck. However, instead of holding a device in the novel device of the invention, the chuck serves as means for moving the jaws 39 which serve to taper the tube. The radially inner ends of jaws 39 serve as die blocks that are formed with die peripheries 51 as shall be fully explained below. The chuck 37 is comprised of an outer housing 41 and has three slots 43 angularly aligned 120° apart in which the jaws 39 are disposed. The edges of each slot 43 serve to guide the movement of the associated jaw 39, causing the jaw to slide radially inwardly and outwardly. Each jaw is comprised of a back plate 45 having a plurality of teeth 47 at the back side thereof. The tool achieves tapering by the front portion 49 formed with a die periphery 51 that engages and tapers the tube. As will be fully explained in conjunction with FIGS. 6, 7, and 8 the die peripheries 51 collectively define a variable die orifice. The front tool portion 49 is secured to the back portion by a key 53 and bolts 55. Within the housing 41 of the chuck are spiraled grooves 57 in which the teeth 47 of the jaws are seated. The grooves are part of a rotary 59 which has a plurality of teeth 61 around the back periphery thereof. The entire chuck assembly 37 is bolted to a support plate 63 disposed within the support structure 23. This prevents rotation of the housing. As indicated the construction of the chuck member 37 is conventional and readily available.

To particularly show the details of the gearing arrangement to actuate the moveable jaws 39 of the chuck with relation to movement of the stylus upon the template used for tapering the tube, reference is had to FIGS. 2–5. Disposed within the housing 23 is a support platform 65 mounted parallel to the base 19. This platform 65 serves as the support for the gearing arrangement utilized. As shown, particularly in FIG. 4, a first shaft 67 is suspended upwardly from bearings 69 disposed within a cavity 71 and the support platforms 65. The shaft 67 is enlarged at the end thereof at 73 and has a keyed portion 75 thereof. This enlarged portion 73 is keyed into the output shaft 7 shown in the dotted line 77 from the hydraulic rotary valve shown in FIG. 1. Disposed on the shaft just above the platform is a larger gear 79. Mounted adjacent on the top of the gear 79 is a second much smaller gear 81. The relationship of these two gears with relation to the device will be explained in the further following description. Mounted on a second shaft 83 extending from the platform 65 of the device is a large gear 85 which engages with the small gear 81 mounted on the first shaft. The shaft 83 is additionally provided with a second smaller gear 87 whose relationship will be later explained. The large gear 79 mounted on the first shaft 67 engages a smaller gear 89 mounted on a third shaft 91 extending from the platform through bearings 93. The gear 89 rotates a second gear 95 disposed on the opposite end of the shaft 91 which extends into the casing 41 of the chuck assembly and engages the teeth 61 provided on the back surface of the spiraled portion of the chuck. The rotation of gear 95 with engagement of the teeth 61 serves to rotate the spiral portion causing the jaws 39 to move according to the rotation of the gear.

Figure 4:
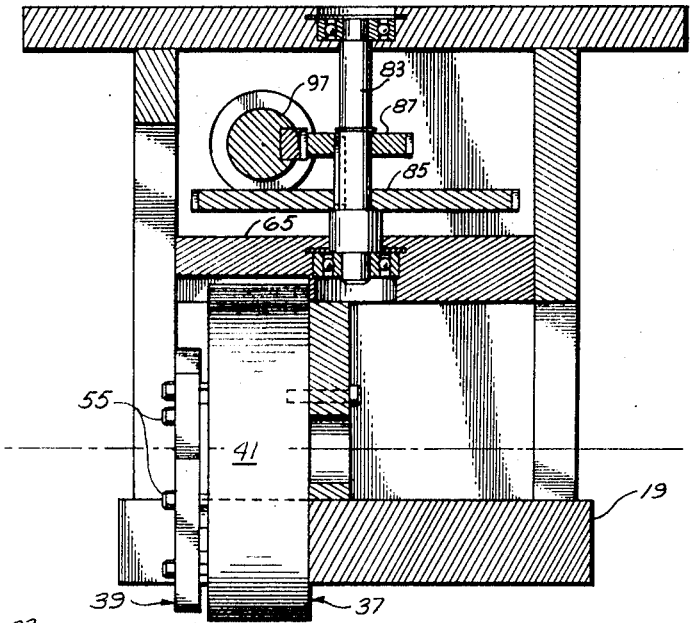
FIG. 4 is a side sectional view of the arrangement of FIG. 3 taken along line 4—4 thereof.

As shown particularly in FIGS. 2 and 4 the gear 87 meshes with a rack 97 which extends into the housing and is affixed to the support arm 33 which in turn as shown in FIG. 1 is connected to the hydraulic proportioner control valve 29 and serves to move the entire proportioner valve assembly. The top view of FIG. 5 additionally shows the particular relationship of the rack 97 to gear 87 as well as disclosing the general arrangement of the gears to one another.

Figure 6:
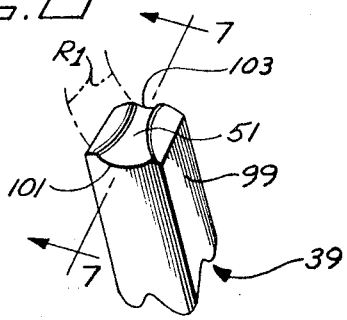
FIG. 6 is a perspective view of an individual jaw formed with a die periphery used for exerting tapering forces on a workpiece.

Referring now to FIG. 6 the radially inner end 99 of an individual jaw 39 is shown formed with a die periphery 51 in the shape of a groove. Die groove 51 extends from leading edge 101 to trailing edge 103. The concave contouring of groove 51 is characterized by a constant radius $R_1$. It should be noted that while the leading edge 101 extends through a greater arc than does trailing edge 103 so that the die orifice inlet is larger than the die orifice exit, the radius of groove 51 from end to end is constant. Being able to fabricate a constant radius die periphery 51 facilitates the fabrication technique. Leading edge 101 is located at the end of groove 51 that first encounters the workpiece to be tapered. The tube may move longitudinally of the die peripheries or vice versa. Trailing edge 103 is the end of groove 51 through which the tapered tube passes. Any workpiece whose radius is equal to or less than groove radius $R_1$ can be tapered in jaws 39. Thus the die grooves need not conform to the workpiece periphery.

Figure 7:
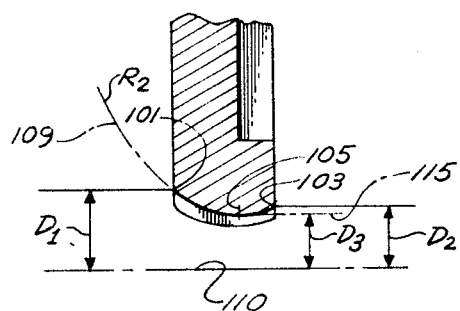
FIG. 7 is a longitudinal cross-sectional view of the jaw taken along line 7—7 of FIG. 6.

FIG. 7 depicts a longitudinal section of jaw 39 taken through the center of groove 51. Longitudinal axis 109 of groove 51 is convex and characterized by a constant radius $R_2$. As mentioned, the three die grooves formed on the jaws collectively define a variable die orifice. While the jaws are simultaneously adjustable to produce a variable size orifice for tapering purposes, the die orifice has a fixed axis 110. Die orifice 110, as can best be seen in FIG. 8, coincides with the axis of the tube 13 being tapered. Referring again to FIG. 7 the radial distance $D_1$ between leading edge 101 and die orifice axis 110 is always greater than the radial distance $D_2$ between trailing edge 103 and die orifice 110. By making the entrance opening of the die orifice larger than the exit opening, admission of the tube into the die orifice is facilitated. The die orifice is most restricted at a throat zone 105 positioned intermediate leading edge 101 and trailing edge 103. The throat is disposed so that a tangent line 115 passing through throat zone 105 will be parallel with die orifice axis 110.

It is well known that many metals when relieved of compressive stress tend to spring back toward their original pre-deformation shapes. The radial distance $D_3$ between tangent line 115 and trailing edge 103 provides adequate expansion space so that trailing edge 103 will not gouge, cut, and pit the tapered portion of the tube egressing through the die orifice exit opening.

Figure 8:
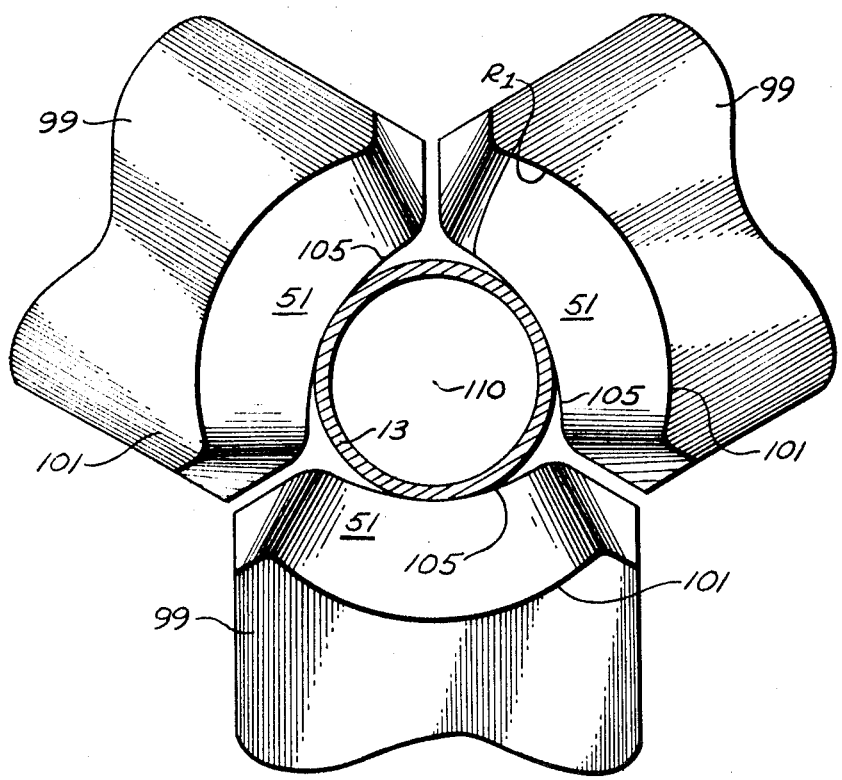
FIG. 8 is a front end view of three coacting jaws and die peripheries showing them making contact with a tubular workpiece.

FIG. 8 is a front end view looking into the die orifice inlet opening, showing the throat zones 105 spaced at greater radial distances from die orifice axis 110 than leading edges 101. Die grooves 51 of the three jaws are shown making substantially point contact at throat zones 105 with tube 13. The radius of tube 13 is shown being smaller than the radius $R_1$ of die grooves 51. The planes containing the longitudinal axes of the die grooves intersect in a straight line that coincides with die orifices axis 110. By this arrangement the deforming forces being transmitted to tube 13 from die grooves 51 are exerted radially against the tube as the tube spins about the axis. The jaws slide inwardly and outwardly in a plane perpendicular to the die orifice axis. As mentioned, since tube 13 is being maintained in axial tension there is no need for utlizing a tube-shaping mandrel that is customarily used in prior art tube tapering machines.

The operation of the device will be explained particularly with reference to FIGS. 1 and 2.

Turning now to the operation of the device, when the device is first started, a hydraulic fluid is pumped from the pump in the housing 11 through one of the lines 35 to the hydraulic proportioner control valve 29 while returning to the pump through the other of the two lines. The proportioner valve is set so that the initial flow of the hydraulic fluid will cause the stylus 21 to move outward seeking the template 27. As the stylus moves outward toward the template, its connection to the proportioner control valve is such that hydraulic fluid is caused to circulate in lines 36 leading to the circular hydraulic piston 25. This in turn causes rotation of the circular piston which as previously indicated, will in turn cause rotation of the shaft 73 connected to gears 79 and 81. When the stylus is seeking the template, as indicated, the circular control piston moves shaft 73 in a counter clockwise direction as shown by the arrow. This in turn will cause a clockwise rotation of large gear 85 meshed with gear 81, this in turn will cause a clockwise rotation of small gear 87 meshing with the rack 97. As can be seen, this will force the rack 97 in an outward direction moving arm 33 in housing 29 out toward the template further serving to force the stylus toward the template. At the same time that this is occurring, large gear 79 is meshing with gear 89 which in turn through gear 95 causes the jaws 39 to move inwardly toward the tube 13 passing therethrough to effect the taper. When the stylus 29 meets the template, no hydraulic fluid circulates through the lines and the jaws are maintained in a constant position. As the template increases in width forcing the stylus 21 toward the housing 23, the hydraulic fluid in lines 35 and 36 reverses its flow due to the effect upon the proportioner control valve. This will cause a movement of the gears opposite to that previously described, since the circular hydraulic piston 25 revolves in an opposite or clockwise direction. This will cause, of course, the rack 97 to move away from the template pulling the proportioner control valve 29 therewith and will cause the jaws 39 to move outwardly or open relative to the tube 13. As can be seen then, the stylus 21 serves to open or close the hydraulic proportioner valve and controls the direction in which the hydraulic fluid in lines 35 and 36 circulates.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A draw die assembly for tapering workpieces of circular cross section, comprising;
   a support structure,
   a chuck connected to the support structure, at least three angularly aligned jaws connected to the chuck, the inner ends of the jaws constituting die peripheries that combine to define a die orifice,
   means on each die periphery forming a die groove having a leading edge and a trailing edge, the die groove being of constant radius from end to end between its leading and trailing edges, and
   means for simultaneously moving the jaws toward and withdrawing them from the die orifice axis to vary the die orifice size.

2. The structure according to claim 1 further comprising:
   means for applying axial tension to the workpiece to be tapered, the axis of the workpiece to be tapered coinciding with the die orifice axis,
   means for relatively rotating the jaws and workpiece to be tapered, and
   means for accomplishing relative longitudinal movement between the jaws and the workpiece to be tapered.

3. The structure according to claim 2 further comprising:
   means forming slots in the chuck extending radially relative to the die orifice axis, the slots being positioned to slidably retain the jaws.

4. The structure according to claim 1 wherein the radial distance between the groove leading edge and the die orifice axis is greater han the radial distance between the groove trailing edge and the die orifice axis so that the die orifice inlet opening for admitting the tube to be tapered is larger than the die orifice exit opening.

5. The structure according to claim 4 wherein each die periphery has a throat area for making point contact with the workpiece to be tapered, the throat area being disposed so a tangent line through the point is parallel with the die orifice axis.

6. The structure according to claim 5 wherein the throat area of each die periphery is longitudinally spaced from the die groove trailing edge, the throat area and trailing edge being radially spaced by a distance sufficient to prevent egressing portions of the workpiece to be tapered from becoming cut by the trailing edge.

7. The structure according to claim 4 wherein the longitudinal axis of each die groove describes a convex line, the planes containing the convex lines mutually intersecting in a line coinciding with the die orifice axis.

8. The structure according to claim 7 wherein the convex line and each die groove is of constant radius.

9. A draw die assembly for tapering workpieces of circular cross section, comprising;
   support structure,
   a chuck connected to the support structure,
   at least three angularly aligned jaws connected to the chuck, the inner ends of the jaws constituting die peripheries that combine to define a die orifice,
   means on each die periphery forming a die groove having a leading edge and trailing edge, the die groove being of constant radius from end to end between its leading and trailing edges, the radial distance between the groove leading edge and the die orifice axis being greater than the radial distance between the groove trailing edge and the die orifice axis so that the die orifice inlet opening for admitting the workpiece to be tapered is larger than the die orifice exit opening, each groove having a longitudinal axis describing a convex line of constant radius, the planes containing the convex lines mutually intersecting in a line coinciding with the die orifice axis, means for simultaneously moving the jaws toward and withdrawing them from the die orifice axis to vary the die orifice size, means for applying axial tension to the workpiece to be tapered, the axis of the workpiece to be tapered coinciding with the die orifice axis, means for relatively rotating the jaws and workpiece to be tapered, and means for accomplishing relative longitudinal movement between the jaws and the workpiece to be tapered.

10. The structure according to claim 9 wherein:
each die periphery has a throat area for making point contact with the workpiece to be tapered, the throat area of each die periphery being longitudinally spaced from the groove trailing edge and radially spaced from the groove trailing edge by a distance sufficient to prevent egressing portions of the workpiece to be tapered from becoming cut by the groove trailing edge.

References Cited

UNITED STATES PATENTS

| | | | |
|---|---|---|---|
| 1,888,401 | 11/1932 | Forster | 72—283 |
| 2,503,464 | 4/1950 | Bannister | 72—69 |
| 3,163,285 | 12/1964 | Nachtman | 72—283 |

R. D. GREFE, Primary Examiner

U.S. Cl. X.R.

72—283, 285, 378, 402